(12) United States Patent
Tourrilhes et al.

(10) Patent No.: US 10,965,788 B2
(45) Date of Patent: Mar. 30, 2021

(54) MULTI-PATH TRANSMISSION CONTROL PROTOCOL (MP-TCP) OPTION TUNNELING FOR MP-TCP PROXIES

(71) Applicant: HEWLETT PACKARD ENTERPRISE DEVELOPMENT LP, Houston, TX (US)

(72) Inventors: Jean Tourrilhes, Mountain View, CA (US); Puneet Sharma, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 42 days.

(21) Appl. No.: 16/357,046

(22) Filed: Mar. 18, 2019

(65) Prior Publication Data

US 2020/0304606 A1  Sep. 24, 2020

(51) Int. Cl.
*H04L 29/06* (2006.01)
*H04L 12/707* (2013.01)
*H04L 12/46* (2006.01)

(52) U.S. Cl.
CPC .......... *H04L 69/14* (2013.01); *H04L 12/4633* (2013.01); *H04L 45/24* (2013.01); *H04L 65/1003* (2013.01); *H04L 65/105* (2013.01); *H04L 69/163* (2013.01)

(58) Field of Classification Search
CPC ..... H04L 69/14; H04L 69/163; H04L 65/105; H04L 65/1003; H04L 45/24; H04L 12/4633
See application file for complete search history.

(56) References Cited

U.S. PATENT DOCUMENTS

| | | | |
|---|---|---|---|
| 8,400,923 | B2 | 3/2013 | Kini |
| 10,021,034 | B2 | 7/2018 | Hong et al. |
| 10,050,870 | B2 | 8/2018 | Reddy et al. |
| 10,097,475 | B2 | 10/2018 | Mildh et al. |
| 2017/0317920 | A1* | 11/2017 | Rocquelay .............. H04L 45/24 |
| 2018/0062979 | A1 | 3/2018 | Zee et al. |
| 2018/0097891 | A1* | 4/2018 | Calo ...................... H04L 45/24 |
| 2018/0103123 | A1* | 4/2018 | Skog ...................... H04L 69/14 |
| 2018/0254979 | A1* | 9/2018 | Scahill .................. H04L 47/193 |

(Continued)

OTHER PUBLICATIONS

Tsinghua University, MPTCP Tunnel: An Architecture for Aggregating Bandwidth of Heterogeneous Access Networks, Mar. 26, 2018, pp. 1-9, Retrieved from the Internet on Dec. 17, 2018 from URL:<hindawi.com/journals/wcmc/2018/2045760/>.

*Primary Examiner* — Michael A Keller
*Assistant Examiner* — Jsing Forng Lin
(74) *Attorney, Agent, or Firm* — McDermott Will & Emery

(57) ABSTRACT

Various aspects of the subject technology relate to methods, systems, and machine-readable media for multi-path transmission control protocol (MP-TCP) proxy tunneling. The method includes reading a first multi-path transmission control protocol (MP-TCP) information from at least one first MP-TCP header, the at least one first MP-TCP header included in a first MP-TCP subflow, the first MP-TCP subflow included in a first MP-TCP session. The method also includes encapsulating the first MP-TCP information in a second MP-TCP session, the second MP-TCP session different from the first MP-TCP session. The method also includes sending the first MP-TCP information through the second MP-TCP session.

20 Claims, 4 Drawing Sheets

(56) References Cited

U.S. PATENT DOCUMENTS

2018/0351852 A1* 12/2018 Boucadair ............. H04L 45/245
2019/0335520 A1* 10/2019 Dion ....................... H04L 69/10
2020/0007449 A1* 1/2020 Morin ................... H04L 45/306

* cited by examiner

MULTI-PATH TRANSMISSION CONTROL PROTOCOL (MP-TCP) OPTION TUNNELING FOR MP-TCP PROXIES

BACKGROUND

The Internet is today mostly known for the vast amount of information and applications offered to its users. However, at its core, the Internet is an interconnection of networks. A simplified view of the Internet architecture is that it includes endpoints (e.g., clients and/or servers) and routers. Routers connect subnets together, allowing the flow of communications from one subnet to the other. A router may connect to two or more subnets. Endpoints connect to one or more subnets, and can communicate directly to other endpoints on the same subnet. Endpoints can also communicate to endpoints on other subnets through appropriate routers.

Most organizations connected to the Internet have a set of Local Area Networks (LANs) supporting the physical locations of the organizations and a set of Wide Area Network (WAN) links connecting those local networks to each other and to the rest of the Internet. A simple setup would be a family having a local Wi-Fi router, the various devices connecting to the Wi-Fi router, and the Wi-Fi router connecting to the Internet via a DSL or Cable connection.

A large company may have multiple physical locations and branches. Each location or branch has a set of LANs. In a traditional configuration, all the branches and locations connect to a few central locations using dedicated WAN links (e.g., usually multiprotocol label switching (MPLS)), and the few central locations connect to the Internet using some WAN links.

BRIEF DESCRIPTION OF THE DRAWINGS

The following detailed description references the drawings, wherein.

Figure 1:
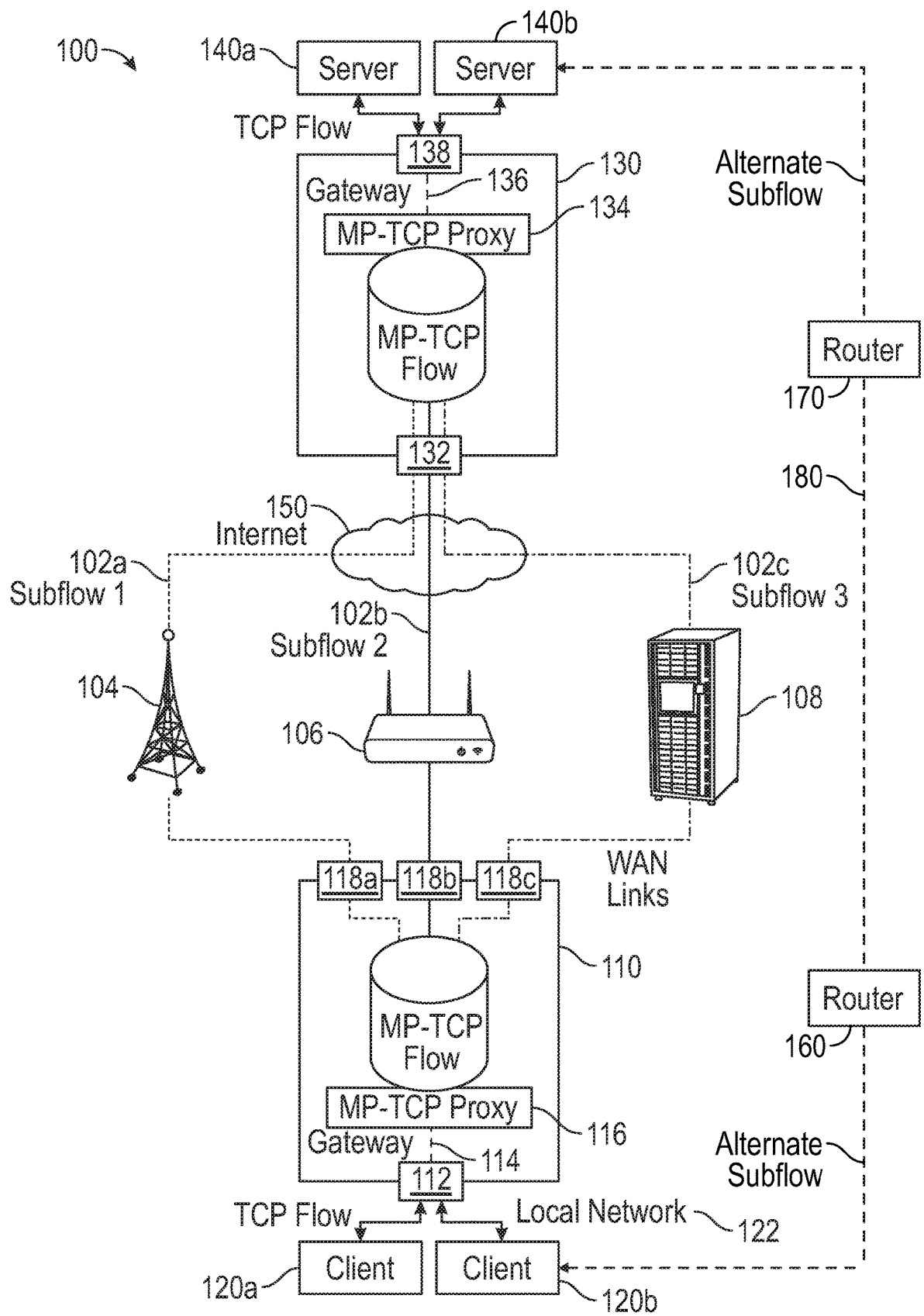
FIG. 1 is a diagram illustrating an example SD-WAN system having MP-TCP option tunneling for MP-TCP proxies, according to certain aspects.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Software-defined networking in a wide area network (SD-WAN) is a new industry technique aiming to make the connection to the WAN cheaper, while retaining good performance and availability. One of the main techniques used in SD-WAN is to replace those dedicated links by tunnels over the Internet (e.g., tunnel handoff) utilizing various available non-dedicated links. In this case, each branch and location has WAN links connected to the Internet, and a router in each branch and location create private tunnels (VPN) to connect to other branches and locations. However, SD-WAN has limitations and it suffers from poor performance in some cases.

A WAN Gateway typically connects Local Area Networks (LANs) to the rest of a network via WAN links. For small networks, the WAN gateway is a single device, for example for home deployment, the WAN Gateway functionality is included in the Wi-Fi router. For more complex networks, the WAN Gateway functionality may be implemented using multiple routers and servers.

Because the WAN Gateway is at the critical location joining the local infrastructure and the external world, it usually implements more functionality than simply routing packets. It may implement all kinds of security functions, such as firewall and packet inspection. It may implement performance optimization functions, such as uplink selection (picking the best WAN link) and TCP WAN optimization. It may implement security and privacy, such as creating tunnels and VPN to other places.

When using SD-WAN, the WAN Gateway connects to the Internet instead of using dedicated private links, so those extra functions are much more critical to achieving the expected level of network performance, security and functionality.

For example, when using a dedicated private link, the provider of the private link will provide some performance and reliability guarantees. In this case, the WAN Gateway can just blindly direct all its traffic on the link, knowing that the link provider will take care of meeting the expected network performance. When using SD-WAN, the WAN links to the Internet often have no performance and reliability guarantees. Therefore, the WAN Gateway must continuously monitor the performance of these WAN links, and redirect traffic amongst the WAN links in order to meet the expected network performance.

Most communications over the Internet are done using the TCP/IP protocol. IP deals with the addressing and routing, in other words, to uniquely identify the two parties of a connection and make sure the connection can reach from one party to the other party. TCP deals with reliability and congestion control. TCP retransmits packets lost in the network. TCP adjusts its sending rate continuously to maximize the performance of the connection while preventing adverse effects of the network (congestion), other communications (unfairness), and the receiver (flow control).

TCP congestion control is notoriously complex, as it tries to infer in real time the condition of the path taken by the TCP connection and adapt to the path conditions. One of the main limitations of TCP congestion control is that it cannot deal with a TCP connection using multiple paths in parallel. Many unwanted behavior occurs when packets of a single TCP connection are dispatched on multiple parallel links. For example, due to the links' different latency, TCP packets might be received out of order, and the TCP congestion control would assume packet loss and trigger spurious retransmissions.

This limitation of TCP is the reason why most technologies dealing with parallel paths, such as link bonding and tunnel bonding, use a TCP flow aware mechanism to direct packets on the parallel paths. Distinct TCP flows can be put on different paths, but all the packets of the same TCP flow are using only a single path.

Multi-path transmission control protocol (MP-TCP) enables a TCP connection to exploit multiple parallel paths and overcome the limitations of plain TCP. For each TCP connection, the MP-TCP manages multiple subflows. Each MP-TCP subflow is managed independently and has its own individual congestion control, like a TCP flow. Each subflow can safely be routed on its own individual path, independent of the other subflows and without adverse consequences. The aim is to route the various MP-TCP subflows on as many different paths as possible to exploit diversity. MP-TCP dynamically assigns the data of the TCP connection to the various MP-TCP subflows, and therefore can support a single TCP connection over multiple parallel paths.

TCP protocol provides a way to operate optional TCP features via the addition of TCP option headers in the packet. The TCP option header mechanism enables adding a small optional chunk of data in the TCP header of every TCP packet (before the payload).

A few TCP option headers are implemented in many TCP stacks and very commonly used, such as Maximum Segment Size (MSS), Window Scaling, Selective Acknowledgements (SACK), and Timestamps. Some of the new proposed improvements of TCP are also using TCP option headers, such as TCP Fast Open and Multipath TCP (MP-TCP).

Those TCP option headers are part of the TCP connection, the state contained in the header directly relate to that TCP connection, and they are produced and consumed by the TCP/IP stack. As such, they are usually not available to the applications at each end of the TCP connection.

When using MP-TCP, each MP-TCP subflow carries its own separate TCP option headers. The TCP option headers for non-MP-TCP options (MSS, SACK, etc.) relate only to the MP-TCP subflow they are carried on. The TCP option headers for MP-TCP are used to manage the MP-TCP session and can relate to other subflows.

In an SD-WAN scenario, multiple WAN links are attached to the SD-WAN gateway, and offer multipath access to the Internet. However, the client is connected to the SD-WAN gateway via a single link, usually Wi-Fi or Ethernet.

The MP-TCP stack is entirely implemented in the client, and makes all its decisions based on the client and server configuration. The SD-WAN gateway does not participate in the MP-TCP negotiation; it only routes IP packets, so with standard MP-TCP, it cannot influence the MP-TCP operation. Because the client connects to the SD-WAN gateway via a single link, it generates only a single MP-TCP subflow for each TCP socket. A single MP-TCP subflow cannot be split by the SD-WAN gateway, and therefore the client cannot exploit all the WAN links of the SD-WAN gateway.

A fundamental problem is that the client is unaware of the diversity of network paths available on the SD-WAN gateway, and the SD-WAN gateway has no way to communicate information about the WAN links to the client. In standard MP-TCP proxies, a client is prevented from utilizing its local path diversity because the MP-TCP information of the client is blocked by the MP-TCP proxy. The server also does not receive the client MP-TCP information from the subflows, so the server cannot tell that the subflows are related to an alternate subflow from the client. This is because the TCP options of the client are blocked by the MP-TCP proxy when the MP-TCP information sent by the client and carried by the subflows is stopped at the MP-TCP proxy, which does not reach the remote server. In other words, the subflows do not carry MP-TCP information about the client. Rather, the subflows are originated either at the MP-TCP proxy or the remote proxy, and may contain MP-TCP information related to only the MP-TCP proxy.

Furthermore, the MP-TCP proxy cannot simply forward the MP-TCP information received from the client on its outgoing connection, because it needs to include its own MP-TCP information. Merging the MP-TCP information of the client and the proxy on the outgoing connection cannot currently be done because the client and the proxy have different cryptographic keys.

Disclosed are methods, systems, and machine-readable media that enhance a MP-TCP proxy in such a way that MP-TCP clients retain the ability to perform multipathing while using the MP-TCP proxy. This works by having the MP-TCP proxy encapsulate the MP-TCP option header of the client MP-TCP session into the MP-TCP session of the MP-TCP proxy.

The disclosed methods, systems, and machine-readable media address a problem in traditional MP-TCP proxy techniques tied to computer technology, namely the technical problem of mutipathing MP-TCP clients with an MP-TCP proxy. The disclosed methods, systems, and machine-readable media solve this technical problem by providing a solution also rooted in computer technology, namely, by encapsulating the MP-TCP option header of the client MP-TCP session into the MP-TCP session of the MP-TCP proxy.

The disclosed subject technology further provides improvements to the functioning of the computer itself because it enables a client to fully exploit their own path diversity and all the WAN links of a WAN gateway when using a MP-TCP proxy. The described techniques also provide better resiliency than using a regular MP-TCP proxy because if a link to the gateway is lost, it retains the use of an alternate link. It also improves performance and resiliency because if one of the WAN links is lost, use of the other WAN links is retained.

According to an aspect, encapsulating the client MP-TCP information allows the outgoing connection of the proxy to carry the MP-TCP information of the client. For example, the MP-TCP option header of the outgoing connection may be configured to carry the MP-TCP information of the proxy. Additionally, the MP-TCP information of the client may be carried by the outgoing connection, instead of in a MP-TCP option header, such that these two types of MP-TCP information (e.g., the client MP-TCP information and the proxy MP-TCP information) may be cleanly separated.

Such encapsulated MP-TCP information may not be sent directly to the server, as the server would not understand how to use the encapsulated client MP-TCP information. Further, in most cases, the encapsulation would make the connection invalid. In an implementation, such an encapsulation technique would include having a remote MP-TCP proxy terminate the proxy connection and decapsulate the client MP-TCP information.

Additional aspects of the present disclosure describe a novel MP-TCP proxy tunneling system architecture to enable a client to use both its local path diversity and WAN path diversity available at a gateway (e.g., SD-WAN gateway). The system further utilizes a modified MP-TCP proxy that is configured to be able to encapsulate MP-TCP option headers.

The described MP-TCP proxy tunneling system architecture fits into current TCP/IP and MP-TCP architectures, and applies to a wide range of deployment scenarios (e.g., SD-WAN and more). The described system also allows any client to exploit local path diversity and WAN path diversity available at an SD-WAN gateway. The described system also minimizes overhead on the client and the WAN gateway, while maximizing performance.

FIG. 1 illustrates an example SD-WAN system (e.g., system 100) having MP-TCP option tunneling for MP-TCP proxies, according to certain aspects of the present disclosure. For example, a conventional SD-WAN system may be implemented as the system 100 to include MP-TCP capabilities.

The system 100 may include clients (e.g., clients 120a and 120b) coupled to a client gateway 110 through a client gateway port 112. For example, a first client 120a may originate a client TCP flow that is received by the client gateway port 112 via the local network 122 (e.g., a LAN). The client gateway 110 may be configured to convert the client TCP flow into a client MP-TCP flow 114. The gateway 110 may include a client MP-TCP proxy 116 that splits the client MP-TCP flow 114 into multiple subflows (e.g., subflows 102a-102c) from multiple client proxy ports (e.g., ports 118a-118c). For example, information contained in the client MP-TCP flow 114 may be distributed among the subflows for faster transmission. According to additional aspects, the subflows may contain the same client information, of which the fastest subflow would be processed first by a server (e.g., server 140a and/or server 140b).

The system 100 may also include a server gateway 130 having a gateway proxy port 132, a server gateway port 138, and a server MP-TCP proxy 134. The server gateway 130 may be configured to receive the multiple subflows (e.g., subflows 102a-102c) at the gateway proxy port 132. The server MP-TCP proxy 134 may be configured to convert and/or combine the subflows into a server MP-TCP flow 136. The server gateway 130 may then convert the server MP-TCP flow 136 into a server TCP flow, which contains the transmitted client information to be received by the server (e.g., at least one of servers 140a and/or 140b).

According to an aspect, the subflows 102a-302c may follow a path from one of the client proxy ports 118a-118c to at least one of an access point 104, a router 106, or a server 108, and then via the Internet 150 to the server gateway 130.

The system 100 may also include a first router 160 and a second router 170 along an alternate subflow path 180 (e.g., an alternate subflow). For example, either or both of the clients 120a and 120b may be coupled to the first router 160, and the first router 160 may be coupled to the second router 170. Additionally, the second router 170 may be coupled to either or both of the servers 140a and 140b through the alternate subflow path 180.

Figure 2:
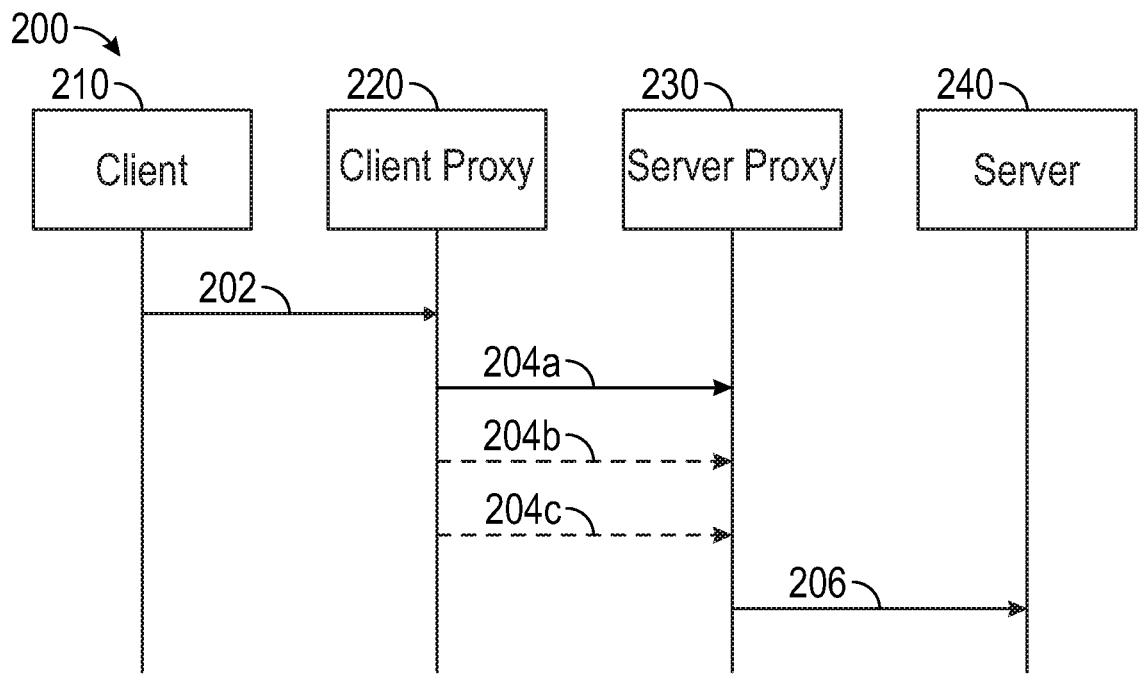
FIG. 2 is an example network flow diagram illustrating MP-TCP option tunneling for MP-TCP proxies, according to certain aspects.

FIG. 2 is an example network flow diagram 200 illustrating MP-TCP option tunneling for MP-TCP proxies, according to certain aspects of the present disclosure. For example, the flow diagram 200 may illustrate an MP-TCP option tunneling process for MP-TCP proxies for the system 100 of FIG. 1.

A client 210 may originate a client subflow 202 (e.g., a local subflow), which may include client MP-TCP information. A local network (e.g., local network 122) may carry the client MP-TCP information in an MP-TCP option header and transmit the client subflow 202 to a client proxy 220 (e.g., client MP-TCP proxy 116). The client proxy 220 may terminate the client subflow 202. The client proxy 220 may then encapsulate the client MP-TCP information and originate proxy subflows 204a-204c (e.g., one subflow 102a-102c per WAN link, as shown in FIG. 1). For example, the client MP-TCP information may be distributed among the proxy subflows 204a-204c. The client MP-TCP information may also be identical among the proxy subflows 204a-204c. This is in order to achieve peak performance in transmitting the client MP-TCP information to a server 240. It is understood that proxy subflows 204b and 204c may be optional based on available WAN resources.

According to an aspect, the proxy subflows 204a-204c may carry proxy MP-TCP information in MP-TCP option headers and may also simultaneously carry the client MP-TCP information in encapsulated form. The proxy subflows 204a-204c may in turn be carried by the WAN links and the Internet.

According to an aspect, a server proxy 230 (e.g., server MP-TCP proxy 134) receives and terminates the proxy subflows 204a-204c, one per WAN link. The server proxy 230 may further be configured to decapsulate the client MP-TCP information and originate a server subflow 206 (e.g., remote subflow). The server subflow 206 may carry the client MP-TCP information in an MP-TCP option header and be transmitted to the server 240 via a remote network (e.g., remote LAN). The server 240 may then terminate the server subflow 206 and receive the client MP-TCP information.

As a result, the proxy connection between the client proxy 220 and the server proxy 230 may utilize the MP-TCP option header according to the standard, and may create one subflow per WAN link using the path diversity provided by a client gateway (e.g., gateway 110). In this way, the MP-TCP information of the client 210 properly reaches the server 240 in the MP-TCP option header as mandated by the standard.

It is understood that although three proxy subflows are illustrated, more or less proxy subflows may be included based on available WAN resources. It is further understood that although one alternate subflow through one alternate path having two routers is illustrated, additional alternate subflows through one or more alternate paths having one or more routers are allowed based on available resources. It is understood that network elements other than routers may be implemented to carry the alternate subflow.

According to additional aspects, MP-TCP information sent by the server 240 on a return path is similarly encapsulated between the proxies 230 and 220, which would be substantially similar to the above-described process but in the reverse direction. In an implementation, the server proxy 230 may be included in the server 240.

In an implementation, encapsulation may be performed utilizing a TCP option header. Because the client MP-TCP information is carried in a TCP option header, it may be encapsulated in a different TCP option header. For example, the formatting of the MP-TCP option header may be kept, and the option type may be changed. According to an aspect, a new option type may be defined, with the proxy re-writing the option header as the newly defined option type. Because of its new type, it would not be recognized as a normal MP-TCP option header by the receiver, but can be recovered by the remote proxy by swapping the original option type back. According to an aspect, one or a few new MP-TCP option subtypes may be utilized to perform encapsulation, either keeping the same format and using multiple subtypes, or using one subtype and a more complex format.

In an implementation, encapsulation may be performed utilizing an IP option header. This is because it is possible to encapsulate the MP-TCP information of the client in the IP header of the subflow. For IPv4, the IP option space contains 40 bytes and for IPv6, the IP extension headers can be any length. For example, the IP option header may be repeated in every IP fragment.

In an implementation, encapsulation may be performed in the payload of the packet. For example, the encapsulated client MP-TCP information may be inserted in front of the regular payload using the same format as the MP-TCP option header. According to an aspect, a pseudo header including both the length of all MP-TCP information and the length of client payload may be included, such that both streams of information may be properly parsed and reconstructed.

As described herein, the system 100 implements a MP-TCP proxy that splits TCP connections and copies data between connections. The MP-TCP information in the MP-TCP header of a first connection is encapsulated into a second connection. The MP-TCP information of the second connection is encapsulated and placed into the MP-TCP header of the first connection. The MP-TCP header of the second connection is changed when the MP-TCP header of the first connection changes.

Figure 3:
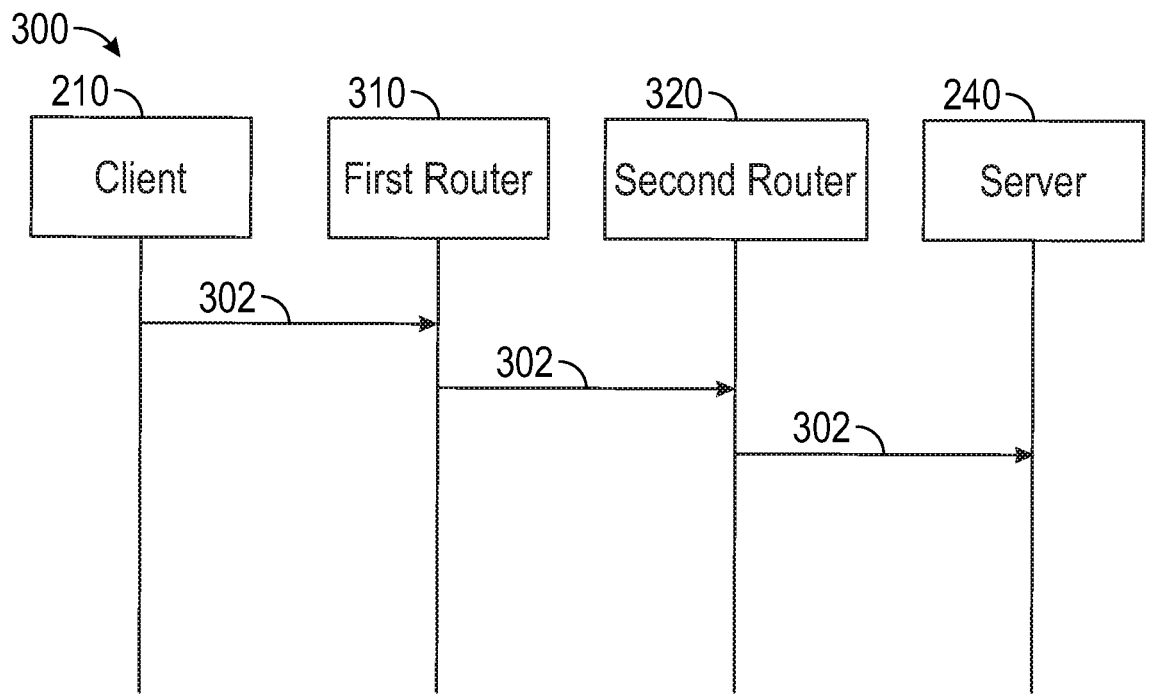
FIG. 3 is an example network flow diagram illustrating alternative MP-TCP option tunneling for MP-TCP proxies, according to certain aspects.

FIG. 3 is an example network flow diagram 300 illustrating alternative MP-TCP option tunneling for MP-TCP proxies, according to certain aspects. For example, the flow diagram 300 may illustrate an MP-TCP option tunneling process for MP-TCP proxies for the system 100 of FIG. 1 through the alternate subflow path 180.

According to aspects of the present disclosure, the server 240 may receive an alternate subflow 302 from the client 210 through a first router 310 (e.g., first router 160) and a second router 320 (e.g., second router 170). The alternate subflow 302 may include client MP-TCP information that is related to MP-TCP information carried by the client subflow 202 of FIG. 2. For example, the alternate subflow 302 and the client subflow 202 may be part of the same MP-TCP session. Because the client MP-TCP information properly reaches the server 240 in the MP-TCP option header as mandated by the standard, the server 240 may properly bind the proxy subflows 204a-204c of FIG. 2 with the alternate subflow 302 of FIG. 3.

According to additional aspects, MP-TCP information sent by the server 240 to the client 210 on a return path through the alternate subflow path 180 would be substantially similar to the above-described process but in the reverse direction.

The present above-described technique enables clients to fully exploit their own path diversity and all the WAN links of the WAN gateway when using a MP-TCP proxy. This technique provides better resiliency than using a regular MP-TCP proxy. If the link to the gateway is lost, it retains the use of the alternate link. It may also improve performance, as it adds one more link. This technique provides better performance than proxy bypass, because it can use all the WAN links of the gateway together. It may also improve resiliency, because if one of the WAN link is lost, it retains the use of the other WAN links.

The techniques described herein may be implemented as method(s) that are performed by physical computing device(s), as one or more non-transitory computer-readable storage media storing instructions (e.g., non-transitory machine-readable storage medium encoded with instructions executable by at least one hardware processor of a network device) which, when executed by computing device(s), cause performance of the method(s), or, as physical computing device(s) that are specially configured with a combination of hardware and software that causes performance of the method(s).

Figure 4:
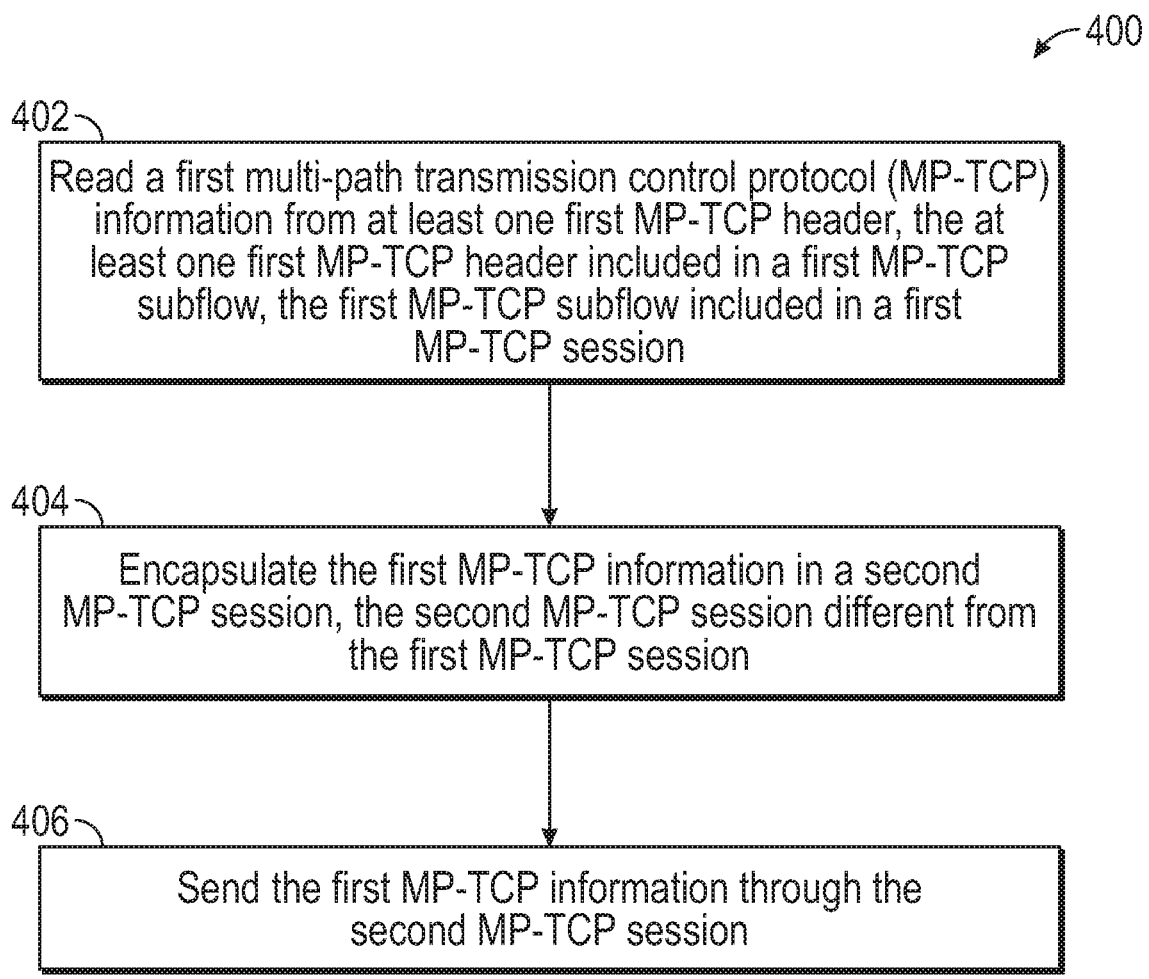
FIG. 4 illustrates an example flow diagram for MP-TCP proxy tunneling.

FIG. 4 illustrates an example flow diagram (e.g., process 400) for MP-TCP proxy tunneling, according to certain aspects of the disclosure. For explanatory purposes, the example process 400 is described herein with reference to the system 100 of FIG. 1. Further, for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed. For purposes of explanation of the subject technology, the process 400 will be discussed in reference to FIG. 1.

At block 402, a first multi-path transmission control protocol (MP-TCP) information is read from at least one first MP-TCP header. The at least one first MP-TCP header may be included in a first MP-TCP subflow. The first MP-TCP subflow may be included in a first MP-TCP session. At block 404, the first MP-TCP information is encapsulated in a second MP-TCP session. The second MP-TCP session may be different from the first MP-TCP session. At block 406, the first MP-TCP information is sent through the second MP-TCP session. In an implementation, the first MP-TCP information may be distributed across a plurality of MP-TCP proxy subflows of the second MP-TCP session.

For example, at block 402, client information (e.g., a first multi-path transmission control protocol (MP-TCP) information) is read from at least one first MP-TCP header. The at least one first MP-TCP header may be included in a client subflow (e.g., a first MP-TCP subflow). The client subflow may be included in a first MP-TCP session. At block 404, the client information is encapsulated in a second MP-TCP session. The second MP-TCP session may be different from the first MP-TCP session. The second MP-TCP session may include at least one proxy subflow (e.g., proxy subflows 102a-102c). At block 406, the client information is sent through the second MP-TCP session. For example, the client information may be distributed across at least one of proxy subflows 102a-102c of the second MP-TCP session.

According to an aspect, the process 400 further includes connecting the second MP-TCP session to a remote proxy through a plurality of links. According to an aspect, the process 400 further includes decapsulating a second MP-TCP information from the second MP-TCP session, reading the second MP-TCP information from the second MP-TCP session, and including the second MP-TCP information in at least one second MP-TCP header. The at least one second MP-TCP header may be included in a packet. The packet may be sent as part of the first MP-TCP subflow.

According to an aspect, the process 400 further includes encapsulating the first MP-TCP information in at least one of an Internet protocol (IP) option header, a transmission control protocol (TCP) option header, or a payload of a packet. According to an aspect, the process 400 further includes terminating the first MP-TCP subflow at a proxy, originating, at the proxy, at least one MP-TCP proxy subflow of the second MP-TCP session, and copying, by the proxy, data between at least the first MP-TCP subflow and the at least one MP-TCP proxy subflow of the second MP-TCP session.

According to an aspect, the encapsulating further includes defining a new option type for the at least one first MP-TCP header, and re-writing, by a proxy, at least one first MP-TCP header as the new option type.

Figure 5:
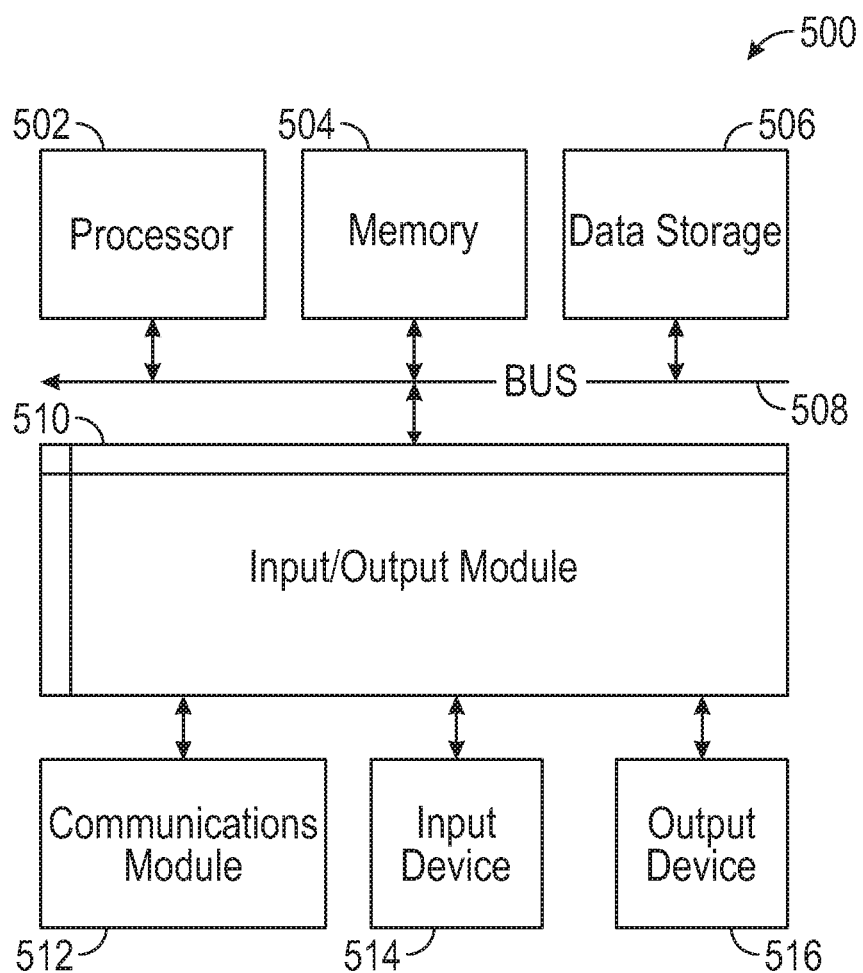
FIG. 5 is a block diagram illustrating an example computer system with which aspects of the subject technology may be implemented.

FIG. 5 is a block diagram illustrating an exemplary computer system 500 with which the system of FIG. 1 may be implemented. In certain aspects, the computer system 500 may be implemented using hardware or a combination of software and hardware, either in a dedicated server, integrated into another entity, or distributed across multiple entities.

Computer system 500 includes a bus 508 or other communication mechanism for communicating information, and a processor 502 coupled with bus 508 for processing information. According to one aspect, the computer system 500 can be a cloud-computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, an FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, an SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 include networking interface cards, such as Ethernet cards and modems.

The components of the system can be interconnected by any form or medium of digital data communication (e.g., a communication network). The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time Division Multiple Access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through a local network to a host computer or to data equipment operated by an Internet Service Provider (ISP). The ISP in turn provides data communication services through the worldwide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display), or an OLED (Organic Light Emitting Diode) display, for displaying information to the user. The output device 516 may comprise appropriate circuitry for driving the output device 516 to present graphical and other information to a user.

According to one aspect of the present disclosure, the systems of FIGS. 1-3 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example, by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, and/or a television set top box.

The term "machine-readable storage medium" or "computer-readable medium" as used herein refers to any medium or media that is provided including instructions or data to processor 502 for execution. The term "storage medium" as used herein refers to any non-transitory computer-readable storage medium that stores data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as "an aspect" or "some aspects" may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
    reading, at a first proxy, a first multi-path transmission control protocol (MP-TCP) information from at least one first MP-TCP header, the at least one first MP-TCP header included in a first MP-TCP subflow, the first MP-TCP subflow included in a first MP-TCP session;
    encapsulating, by the first proxy, the first MP-TCP information in a second MP-TCP session, wherein the second MP-TCP session is different from the first MP-TCP session, wherein the second MP-TCP session comprises a set of proxy subflows to a second proxy, wherein the first MP-TCP information is distributed identically to each of the set of proxy subflows; and
    sending the encapsulated first MP-TCP information through the second MP-TCP session to the second proxy prior to sending to a server,
    wherein a return path comprises a path from the server to the second proxy to the first proxy to a client that originated the first MP-TCP information, and wherein the return path is used to send additional MP-TCP information.

2. The method of claim 1, further comprising:
    connecting the second MP-TCP session to a remote proxy through a plurality of links.

3. The method of claim 1, further comprising:
    decapsulating a second MP-TCP information from the second MP-TCP session;
    reading the second MP-TCP information from the second MP-TCP session; and
    including the second MP-TCP information in at least one second MP-TCP header, wherein the at least one second MP-TCP header being included in a packet, and wherein the packet being sent as part of the first MP-TCP subflow.

4. The method of claim 1, further comprising:
    encapsulating the first MP-TCP information in at least one of an Internet protocol (IP) option header, a transmission control protocol (TCP) option header, or a payload of a packet.

5. The method of claim 1, further comprising:
    terminating the first MP-TCP subflow at a proxy;
    originating, at the proxy, at least one MP-TCP proxy subflow of the second MP-TCP session; and
    copying, by the proxy, data between at least the first MP-TCP subflow and the at least one MP-TCP proxy subflow of the second MP-TCP session.

6. The method of claim 1, wherein the encapsulating further comprises:
    defining a new option type for the at least one first MP-TCP header; and
    re-writing, by the first proxy, the at least one first MP-TCP header as the new option type.

7. A system, comprising:
    a memory; and
    a processor executing instructions from the memory to:
        read, at a first proxy, a first multi-path transmission control protocol (MP-TCP) information from at least one first MP-TCP header, the at least one first MP-TCP header included in a first MP-TCP subflow, the first MP-TCP subflow included in a first MP-TCP session;
        encapsulate, by the first proxy, the first MP-TCP information in a second MP-TCP session, wherein the second MP-TCP session is different from the first MP-TCP session, wherein the second MP-TCP session comprises a set of proxy subflows to a second proxy, wherein the first MP-TCP information is distributed identically to each of the set of proxy subflows; and
        send the encapsulated first MP-TCP information through the second MP-TCP session to the second proxy prior to sending to a server,
        wherein a return path comprises a path from the server to the second proxy to the first proxy to a client that originated the first MP-TCP information.

8. The system of claim 7, wherein the processor further executes the instructions from the memory to:
    connect the second MP-TCP session to a remote proxy through a plurality of links.

9. The system of claim 7, wherein the processor further executes the instructions from the memory to:
    decapsulate a second MP-TCP information from the second MP-TCP session;
    read the second MP-TCP information from the second MP-TCP session; and
    include the second MP-TCP information in at least one second MP-TCP header, wherein the at least one second MP-TCP header being included in a packet, and wherein the packet being sent as part of the first MP-TCP subflow.

10. The system of claim 7, wherein the processor further executes the instructions from the memory to:
    encapsulate the first MP-TCP information in at least one of an Internet protocol (IP) option header, a transmission control protocol (TCP) option header, or a payload of a packet.

11. The system of claim 7, wherein the processor further executes the instructions from the memory to:
    terminate the first MP-TCP subflow at a proxy;
    originate, at the proxy, at least one MP-TCP proxy subflow of the second MP-TCP session; and copy, by the proxy, data between at least the first MP-TCP subflow and the at least one MP-TCP proxy subflow of the second MP-TCP session.

12. The system of claim 7, wherein the processor further executes the instructions from the memory to:
define a new option type for the at least one first MP-TCP header; and
re-write by the first proxy the at least one first MP-TCP header as the new option type.

13. A non-transitory machine-readable storage medium encoded with instructions executable by at least one hardware processor of a network device, the non-transitory machine-readable storage medium comprising instructions to:
read, at a first proxy, a first multi-path transmission control protocol (MP-TCP) information from at least one first MP-TCP header, the at least one first MP-TCP header included in a first MP-TCP subflow, the first MP-TCP subflow included in a first MP-TCP session;
encapsulate, by the first proxy, the first MP-TCP information in a second MP-TCP session, wherein the second MP-TCP session is different from the first MP-TCP session, wherein the second MP-TCP session comprises a set of proxy subflows to a second proxy, wherein the first MP-TCP information is distributed identically to each of the set of proxy subflows; and
send the encapsulated first MP-TCP information through the second MP-TCP session to the second proxy prior to sending to a server,
wherein the server binds the set of proxy subflows with an alternate subflow from a client that originated the first MP-TCP information, wherein the alternate subflow was transmitted without the first proxy or the second proxy.

14. The non-transitory machine-readable storage medium of claim 13, further comprising instructions to:
connect the second MP-TCP session to a remote proxy through a plurality of links.

15. The non-transitory machine-readable storage medium of claim 13, further comprising instructions to:
decapsulate a second MP-TCP information from the second MP-TCP session;
read the second MP-TCP information from the second MP-TCP session; and
include the second MP-TCP information in at least one second MP-TCP header, wherein the at least one second MP-TCP header being included in a packet, and wherein the packet being sent as part of the first MP-TCP subflow.

16. The non-transitory machine-readable storage medium of claim 13, further comprising instructions to:
encapsulate the first MP-TCP information in at least one of an Internet protocol (IP) option header, a transmission control protocol (TCP) option header, or a payload of a packet.

17. The non-transitory machine-readable storage medium of claim 13, further comprising instructions to:
define a new option type for the at least one first MP-TCP header; and
re-write by the first proxy the at least one first MP-TCP header as the new option type.

18. The method of claim 1, wherein the at least one first MP-TCP header is repeated in multiple IP fragments.

19. The system of claim 7, wherein the at least one first MP-TCP header is repeated in multiple IP fragments.

20. The non-transitory machine-readable storage medium of claim 13, wherein the at least one first MP-TCP header is repeated in multiple IP fragments.

* * * * *